July 5, 1960 H. A. R. DE MIRANDA 2,944,166
BISTABLE TRIGGER CIRCUIT
Filed Sept. 19, 1957
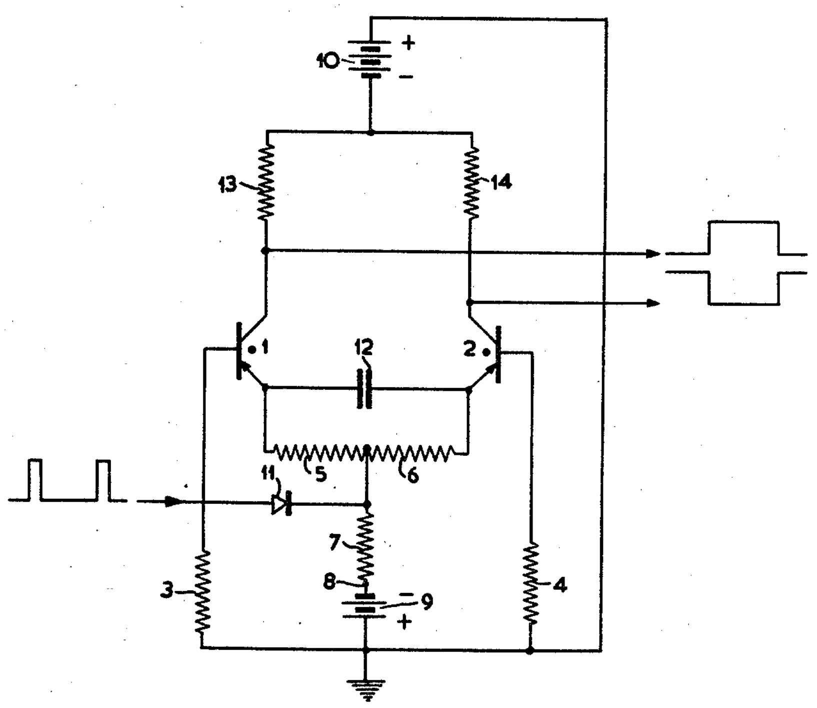
INVENTOR
HEINE ANDRIES RODRIGUES DE MIRANDA
BY
AGENT United States Patent Office 2,944,166

Patented July 5, 1960

2,944,166

BISTABLE TRIGGER CIRCUIT

Heine Andries Rodrigues de Miranda, Eindhoven, Netherlands, assignor to North American Philips Company, Inc., New York, N.Y., a corporation of Delaware Filed Sept. 19, 1957, Ser. No. 684,942

Claims priority, application Germany Oct. 9, 1956

4 Claims. (Cl. 307—88.5)

This invention relates to bistable trigger circuit arrangements comprising two transistors of the current-amplifying kind, each of the bases of which is connected through a resistor to a point of constant potential, the emitters being connected to a common point of constant potential through resistors.

Such a trigger circuit is described, for example, in "Radiotechnik" of October-November 1955, in an article by Kurt Walk on "Transistor Trigger Circuits," on pages 322 and 323 and with reference to Fig. 3. This article, however, does not explain how each transistor is alternately switched on and off, and the circuit diagram of Fig. 3 does not show a "memory element," which retains the condition of the circuit arrangement prior to the application of a control pulse and which, after both transistors have been made conductive by a control pulse, causes that transistor to remain conductive which was non-conductive before the control action. This "memory" may be constituted by the collector-base capacitances of the transistors of by capacitors (not shown) connected in parallel with the collector load resistances $R_c$. When a subsequent circuit is connected to one of the collectors or when two different circuits to be controlled by the trigger circuit are connected to both collectors, the symmetry of the trigger circuit is lost and the alternating change-over may no longer be effected with the required reliability.

It is an oject of the present invention to obviate this disadvantage of the known trigger circuits of the kind described hereabove.

A trigger circuit arrangement in accordance with the invention is characterized in that the emitters of the two transistors are connected to one another through a capacitor which acts as a memory, symmetrical output voltages being produced across separate collector resistors.

In order that the invention may readily be carried out, one embodiment thereof will now be described, by way of example, with reference to the accompanying drawing, which shows a circuit diagram of a trigger circuit arrangement in accordance with the invention.

Referring now to the figure, the trigger circuit shown comprises two transistors 1 and 2 of the current-amplifying kind, for example PNPN-transistors, the bases of which are connected to a point of constant potential, as shown to ground, through resistors 3 and 4 respectively. The emitters of the transistors are connected through resistors 5 and 6; the junction of resistors 5 and 6 is connected to another point 8 through resistor 7, the potential of point 8 being fixed at, say −2 volts with respect to ground by a bias supply 9 connected between the bases and emitters of the two transistors as shown.

The two transistors 1 and 2 are coupled to each other by the common emitter resistor 7, the value of which is such that, if for example the transistor 1 is conductive, the transistor 2 is cut off by the voltage drop across the resistor 7 and the reverse bias voltage of the supply 9. Since the base and emitter currents of the transistor 1 flow from ground to its collector, the voltage drop produced across the base resistor 3 by this base current can exceed the sum of the voltage drop across the resistors 5 and 7 and of the voltage of the supply 9, so that the transistor 1 remains conductive. However, the base current of the transistor 2 is zero, so that this transistor remains cut off by the sum of the reverse bias voltage of the supply 9 and of the voltage drop across the resistor 7.

When a positive pulse is supplied through a separating diode 11 to the junction of the emitter circuits of the two transistors between ground and the junction of the resistors 5, 6, and 7, the condition of the conductive and saturated transistor 1 is not changed, whereas the initially cut off transistor 2 becomes conductive for a short period of time. With a suitable choice of the load resistors, only one of the transistors can remain conductive at the end of the control pulse. Which transistor remains conductive is determined by slight asymmetries of the circuit arrangement, and generally the same transistor which was conductive before the application of the pulse remains conductive at the cessation of the pulse.

According to the invention, the emitters of the two transistors are connected to one another through a capacitor 12, their collectors being connected, each through a load resistor 13 and 14 respectively, to the negative terminal of a collector voltage supply source 10. Consequently symmetrical output voltages are produced across these separate collector resistors when the trigger circuit changes its condition.

If it is assumed that the transistor 1 is initially conductive, the capacitor 12 is charged with a potential difference equal to the voltage drop across the resistor 5 and at the beginning of a control pulse, the emitter of the transistor 1 remains more highly negative than the emitter of the transistor 2, so that, when the latter is made conductive by the control pulse, its current is larger than the current of the transistor 1. Owing to the introduction of this asymmetry, the transistor 2 remains conductive at the end of the control pulse, whereas the transistor 1 is cut off. Thus, the transistors 1 and 2 are alternately rendered conductive and non conductive by successive positive control pulses.

The circuit has a third condition, in which both transistors are cut off, and it can be made to pass or return to this third condition, for example, by supplying negative instead of positive pulses to the junction of resistors 5, 6 and 7.

The voltage sources 9 and 10 may be replaced by a single source and a potential divider.

The PNPN-transistors can be replaced by NPNP-transistors if the polarities of the voltage sources and of the source of control pulses are reversed. Use may also be made of point-contact transistors. The bias supply 9 may be dispensed with; however, it provides a greater degree of freedom in the choice of the values of the various resistors and it enables the said third condition to be obtained.

The trigger circuit arrangement described is simple and reliable and comprises only a small number of components. One example of its use is in a pulse frequency division circuit arrangement.

What is claimed is:

1. A bistable trigger circuit arrangement comprising two transistors of the current amplifying type, each transistor having base, emitter and collector electrodes, each of said emitter electrodes being connected to a first point of constant potential through an emitter resistor which comprises a first portion connected to an associated respective emitter electrode and a second portion connected to said first point of constant potential, each of said collector electrodes being connected to a source of supply voltage through a collector resistor, each of said base electrodes being connected solely to a second point of constant potential through a base resistor, means for intercoupling said transistors comprising a capacitor connected across said emitter electrodes, the second portion of said emitter resistor being common to both emitter electrodes, said arrangement causing only one transistor at a time to remain conductive while the other is non-conductive.

2. A circuit arrangement according to claim 1, further comprising a source of bias voltage connected between said first and second points, said bias voltage having a polarity to bias the base and emitter electrodes of each transistor in the reverse direction.

3. A circuit arrangement according to claim 1, further comprising means for applying trigger pulses to the junction of said first and second portions.

4. A circuit arrangement according to claim 1, further comprising a source of bias voltage connected between said first and second points, said bias voltage having a polarity to bias the base and emitter electrodes of each transistor in the reverse direction.

References Cited in the file of this patent

UNITED STATES PATENTS

| | | |
|---|---|---|
| 2,531,076 | Moore | Nov. 21, 1950 |
| 2,622,212 | Anderson et al. | Dec. 16, 1952 |
| 2,665,845 | Trent | Jan. 12, 1954 |
| 2,673,936 | Harris | Mar. 30, 1954 |
| 2,832,899 | Brewster | Apr. 29, 1958 |
| 2,843,761 | Carlson | July 15, 1958 |

FOREIGN PATENTS

| | | |
|---|---|---|
| 158,699 | Australia | Aug. 13, 1953 |